Figure 1:
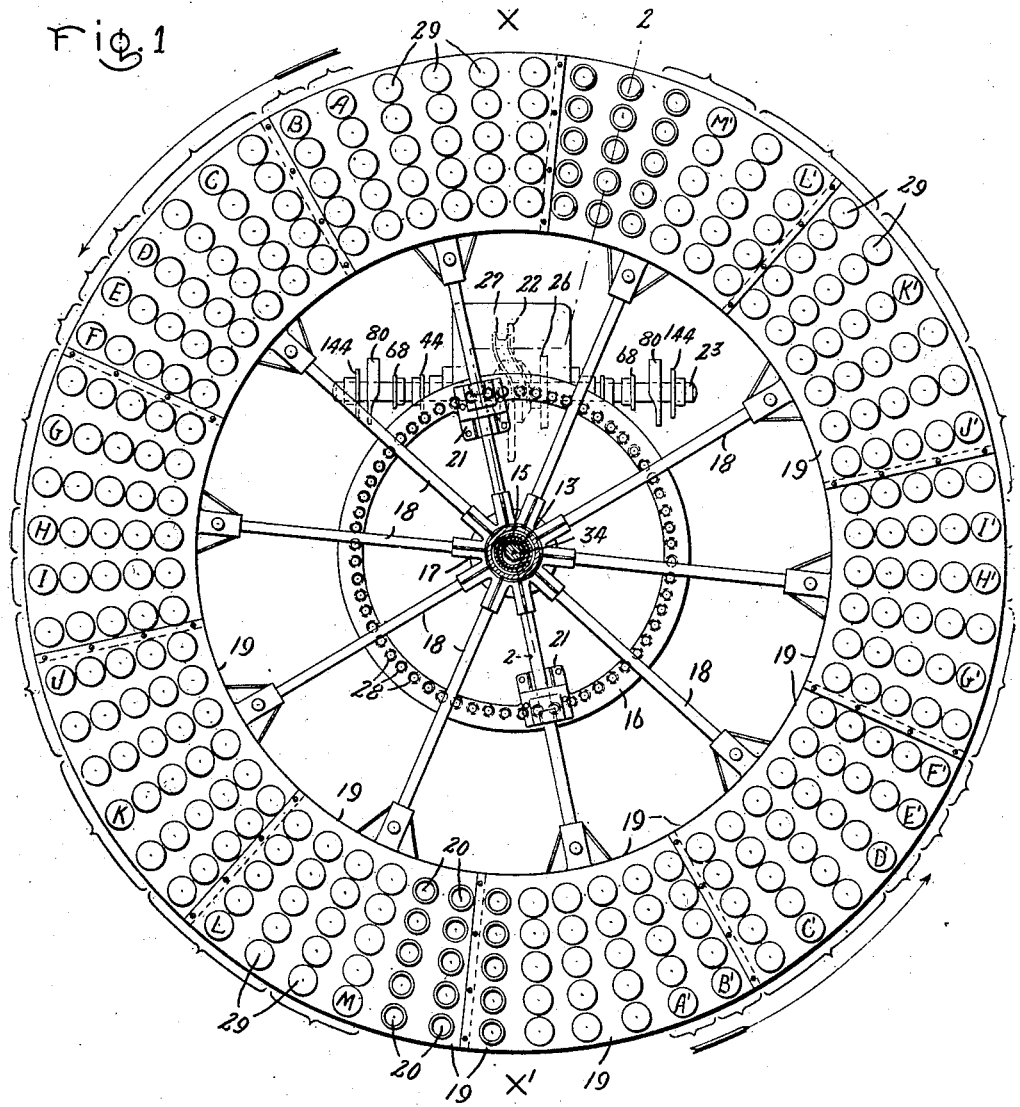

Jan. 3, 1928.

R. G. PHELPS ET AL 1,655,290

MACHINE FOR TREATING HOLLOW GLASS ARTICLES

Filed April 13 1926 6 Sheets-Sheet

*INVENTORS:*
*ROSCOE G. PHELPS,*
*LUDWIG STAUDENMEIR,*
BY
*THEIR ATTORNEY.*

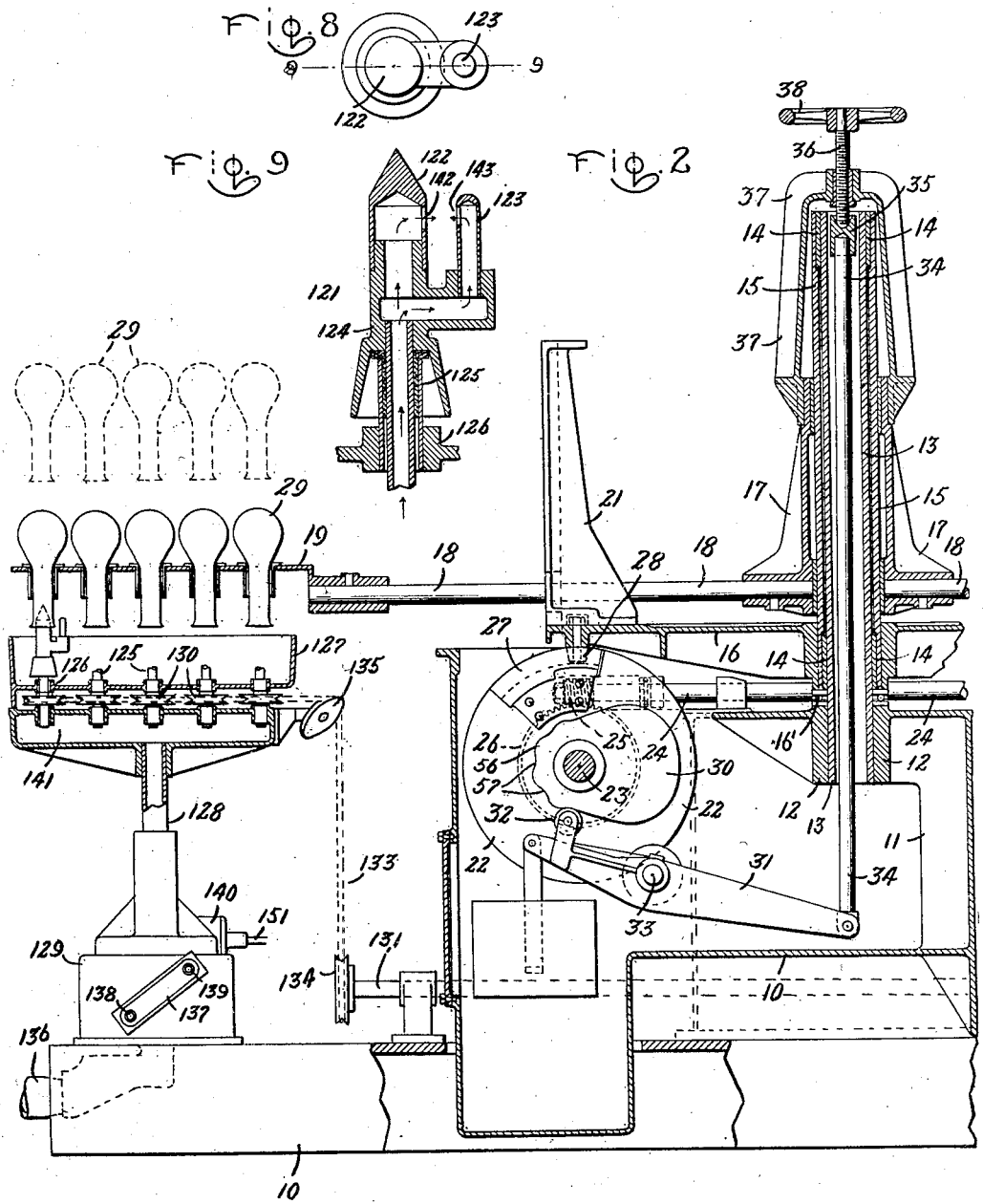

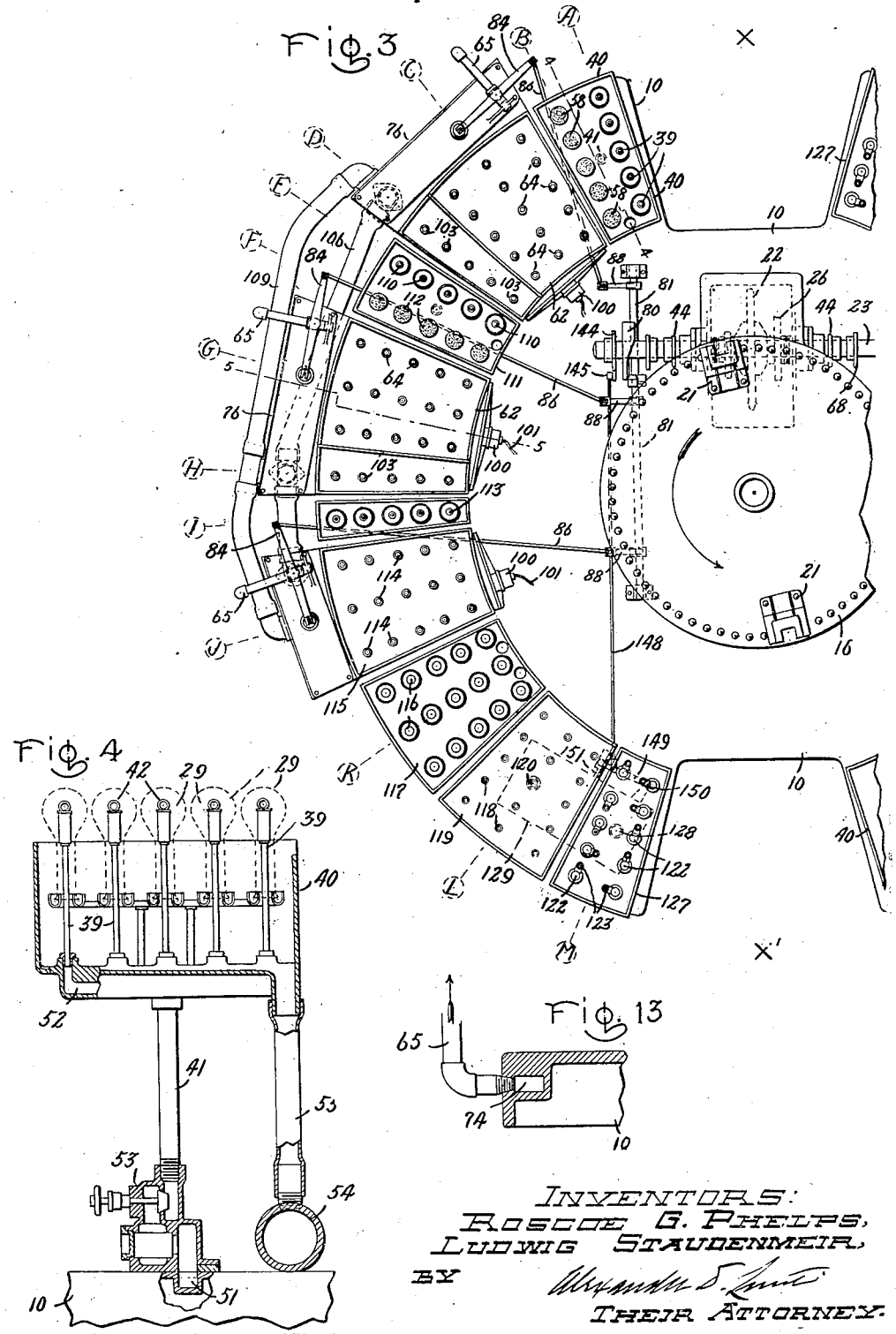

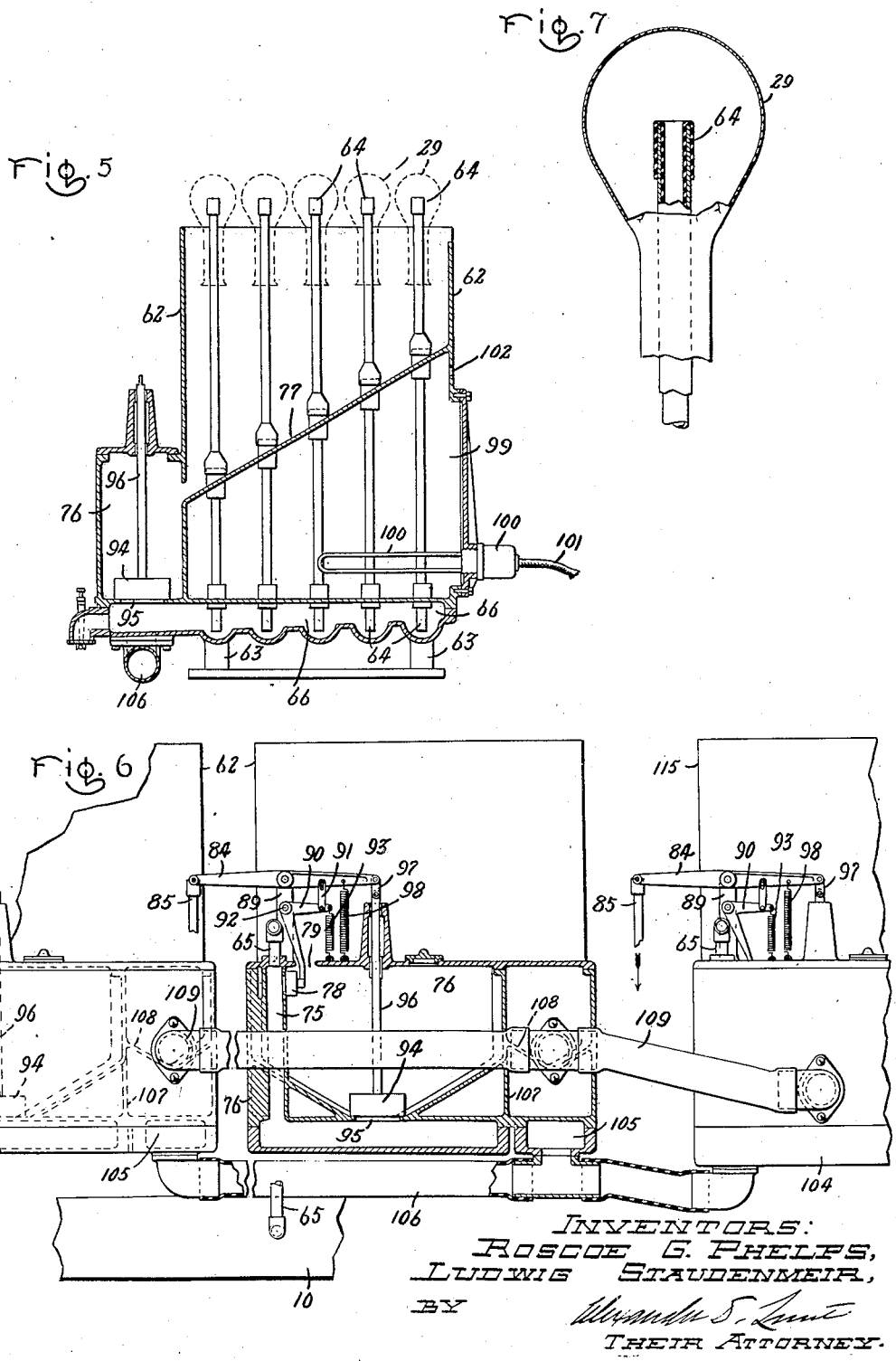

Jan. 3, 1928.
R. G. PHELPS ET AL
1,655,290
MACHINE FOR TREATING HOLLOW GLASS ARTICLES
Filed April 13, 1926    6 Sheets-Sheet 5
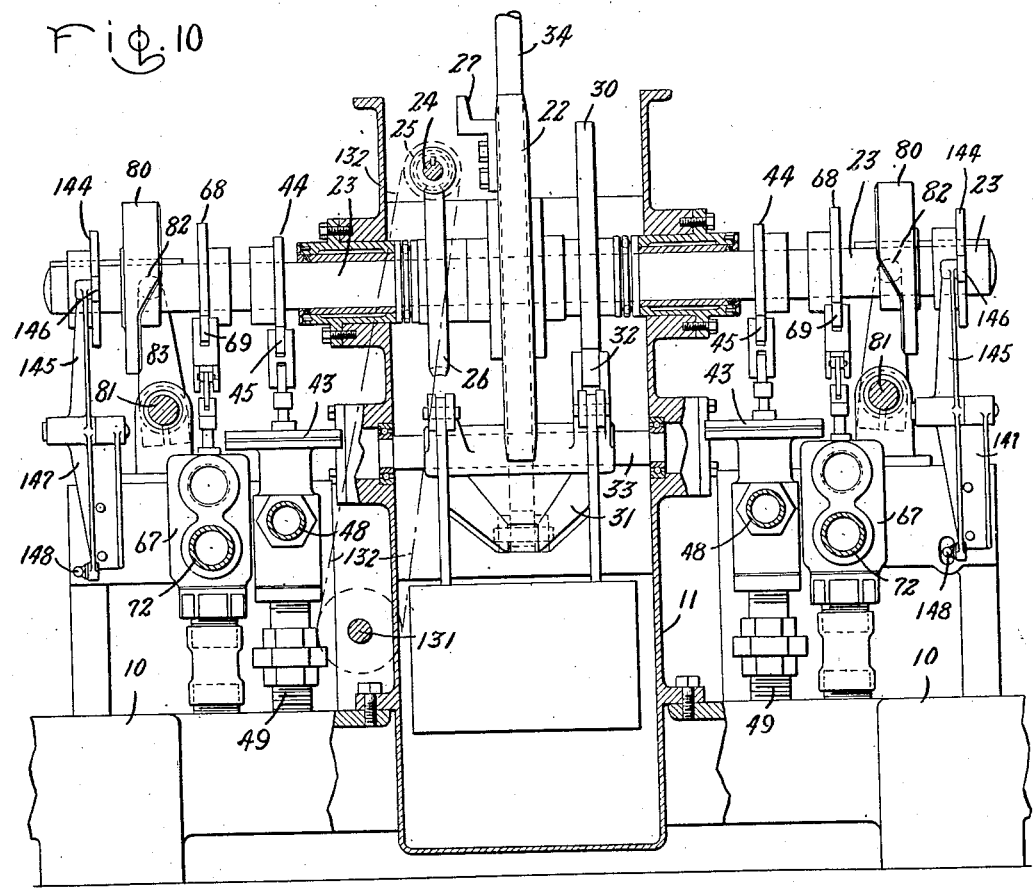
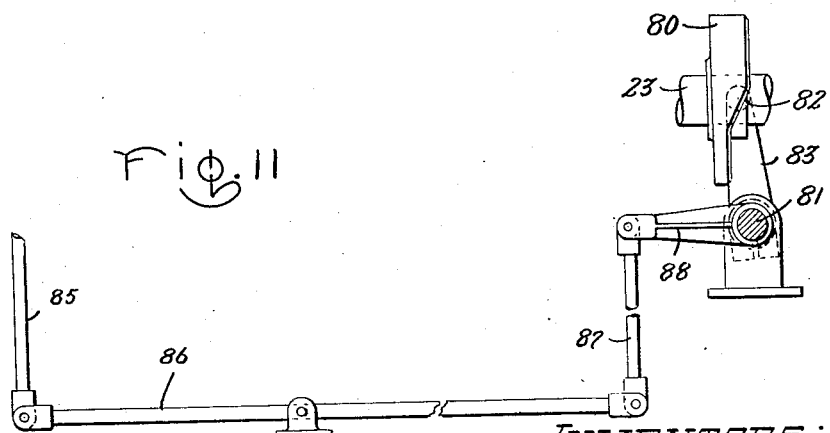
INVENTORS:
ROSCOE G. PHELPS,
LUDWIG STAUDENMEIR,
BY
THEIR ATTORNEY.

Jan. 3, 1928.
R. G. PHELPS ET AL
1,655,290
MACHINE FOR TREATING HOLLOW GLASS ARTICLES
Filed April 13 1926   6 Sheets-Sheet 6
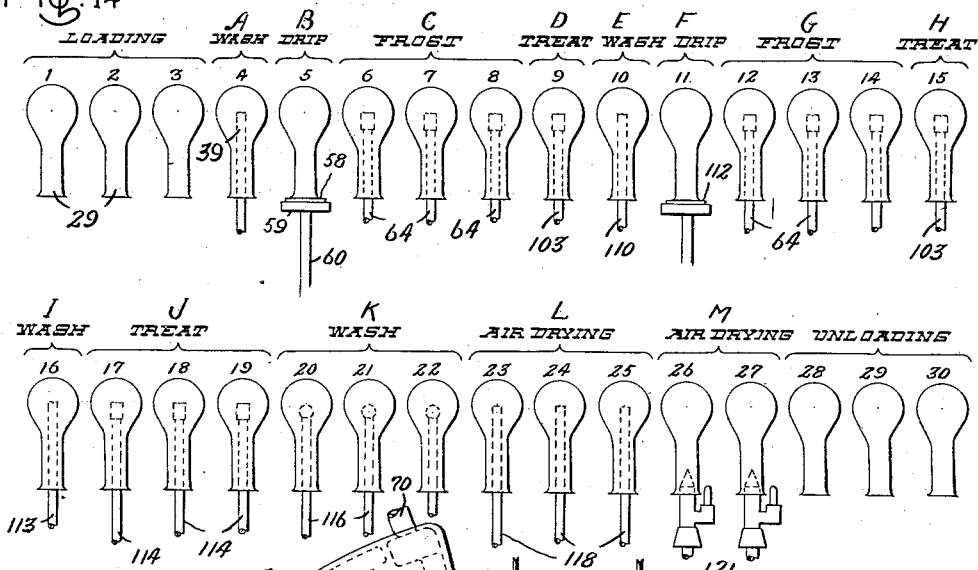
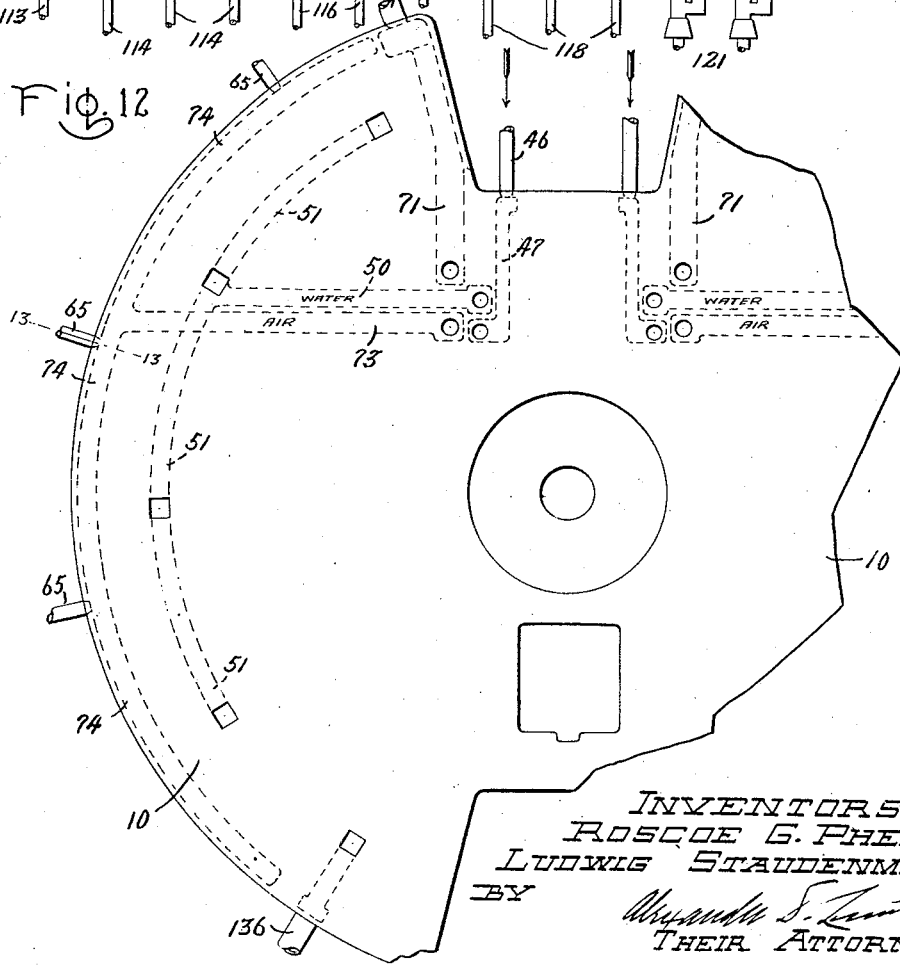
INVENTORS:
ROSCOE G. PHELPS,
LUDWIG STAUDENMEIR,
BY
THEIR ATTORNEY.

Patented Jan. 3, 1928.

1,655,290

UNITED STATES PATENT OFFICE.

ROSCOE G. PHELPS, OF CLEVELAND, AND LUDWIG STAUDENMEIR, OF CLEVELAND HEIGHTS, OHIO, ASSIGNORS TO GENERAL ELECTRIC COMPANY, A CORPORATION OF NEW YORK.

MACHINE FOR TREATING HOLLOW GLASS ARTICLES.

Application filed April 13, 1926. Serial No. 101,791.

Our invention relates to machines for coating or frosting the inner surfaces of hollow glass articles, and more particularly to machines for frosting bulbs and other similarly thin glassware which is used for electrical and illuminating purposes. Still more particularly it relates to machines for coating or frosting bulbs on the inside thereof, as, for example, by the method set forth in the pending application of Marvin Pipkin, Serial No. 40,152, filed June 29, 1925, being a continuation of Serial No. 690,672, filed February 4, 1924. Our object is to produce a machine capable of automatic operation in an efficient and economical manner. Other features and advantages of our invention will appear from the description which follows of a species thereof.

According to our invention, we provide a movable carrier having mounted thereon a number of holders, each adapted to receive and hold a glass article in a substantially vertical position. The said carrier serves to present the glass articles in succession to various means located in the path of travel thereof, each of which is adapted to perform a particular operation. The novel features of our invention are pointed out with greater particularity in the appended claims, but the invention will best be understood in connection with the accompanying drawings, in which we have shown, merely for purposes of illustration, one of the various forms of apparatus suitable for the practice of our invention, and in which Fig. 1 is a plan view of a machine embodying our invention; Fig. 2 is an enlarged fragmentary vertical section along the line 2—2 of Fig. 1; Fig. 3 is a fragmentary plan with the carrier removed so as to more clearly show the mixture pots; Fig. 4 is a vertical section through the water washing apparatus along the line 4—4 of Fig. 3; Fig. 5 is a vertical section through one of the frosting mixture supply pots along the line 5—5 of Fig. 3; Fig. 6 is a fragmentary elevation partially in section of a series of frosting mixture and treating pots; Fig. 7 is a fragmentary detail showing an electric incandescent lamp bulb extending over one of the nozzles which spray the frosting mixture on the inner surface of the said bulb; Fig. 8 is a plan view of one of the rotary nozzles which supply warm air for drying the bulbs after the frosting operation has been completed; Fig. 9 is a vertical section along the line 9—9 of Fig. 8; Fig. 10 is an elevation partially in section of the cam shaft and various valve operating cams; Fig. 11 is a fragmentary detail of the air valve operating mechanism; Fig. 12 is a fragmentary plan of a base which supports the machine; Fig. 13 is a fragmentary section along the line 13—13 of Fig. 12; and Fig. 14 is a diagrammatic view showing the bulbs at various stages of the frosting operation.

As shown in Figs. 1 to 3, inclusive, the various elements of the machine are carried by a base 10. A standard or housing 11 carried by the base 10 has formed therein a bearing 12 which has extending therefrom a stationary hollow vertical shaft 13. Surrounding the said shaft 13, and separated therefrom by spacers 14, is another hollow shaft 15 having mounted thereon the rotating turret 16 which rests on a ball race 16' supported by the housing 11. Slidably and rotatably mounted on the shaft 15 above the turret 16 is a spider 17 which has extending radially therefrom a number of horizontally disposed rods 18, each carrying at its opposite end a curved segment 19. These segments when properly assembled, as shown in Fig. 1, form a suitable carrier for the glass articles. In the particular form shown, each segment comprises a number of recesses 20, each adapted to receive a glass article and carry it in a substantially vertical position. The carrier moves in the direction of the arrows (Fig. 1), its movement being accomplished through the turret 16 by means of the attached uprights 21, which have extending therethrough the horizontal rods 18.

The intermittent drive for the turret comprises a continuously rotating disc 22 mounted upon a cam shaft 23, which is driven from an outside source, such as a motor (not shown) through the main drive shaft 24, worm 25, and gear 26. Mounted on the disc 22 is a grooved cam 27, designed so as to engage the rollers 28 fastened to the underside of the turret. The shape of the cam 27 is such that when it engages a roller the turret is rotated, during which time the carrier is also caused to move therewith. By means of the rotatable carrier, each glass article during its travel around the machine is brought into operative relation to various devices in succession, and is held there stationary for a short time while each device automatically performs some operation on the said glass article. In the particular machine illustrated, the driving mechanism is so designed that the carrier for the glass articles stops in sixty different positions during one complete rotation of the turret 16, although a greater or lesser number of positions may be used, if desired. As shown in Figs. 1, 3 and 14, the various devices which are located in the path of travel of the carrier are situated at stations which are indicated as A to M and A' to M'. Each station may comprise one or more of the positions where the said carrier stops.

As shown in Fig. 1, the glass articles, such, for instance, as the electric incandescent lamp bulbs 29, are loaded upon the carrier by an operator who is stationed at X. The bulbs are placed in the recesses 20 with their open ends depending downward, and are held in a substantially vertical position during their travel. The carrier is intermittently rotated in the direction of the arrow over a number of idle positions prior to reaching station A, so as to give the operator ample time to place the bulbs thereon. As the carrier stops at each position, it is lowered so as to cause the open ends of the bulbs to register with various means which act upon the said bulbs so as to properly frost or coat them on the inside.

The raising and lowering of the carrier is accomplished by means of cam 30 (Figs. 2 and 10) which operates a lever 31 through a roller 32 carried by the said lever. The lever is rotatably mounted on a shaft 33, and carries at its opposite end a vertical rod 34, which extends up through the hollow shaft 13. At the upper end of the rod 34 is fastened a block 35, which is cup shaped, so as to receive and pivotally support an adjusting screw 36, having mounted thereon a bracket 37, to which is attached the carrier spider 17. The cam shaft 23 which carries the cam 30 is so timed that as the carrier stops at each position, the cam is rotated, whereupon the roller 32 rides off the high point of said cam, thereby causing the rod 34, bracket 37, and spider 17 to be lowered through the lever 31. The vertical movement of the carrier may be adjusted so that the bulbs carried thereby may register accurately with the various means which act upon them during their travel around the machine. This adjustment is accomplished by turning the hand wheel 38 which is fastened to the upper end of the adjusting screw 36.

Prior to frosting the bulbs, it is desirable, although not necessary, to thoroughly wash them so as to dislodge or remove any foreign substance, such as dust or dirt, which may accumulate on the inside of the bulbs where the frosting material is to be applied. A convenient means for washing the bulbs is located at station A, and, as shown in Figs. 3 and 4, comprises a number of pipes 39, which extend from a housing 40 carried by a hollow standard 41 supported by the base 10. As the carrier stops with a row of bulbs whose open ends are in alignment, but somewhat above the pipes 39, the cam 30 lowers the carrier through the mechanism previously described, so as to place the bulbs over the said pipes. At the proper time, water is allowed to issue from the nozzles 42 attached to the ends of the pipes, so as spray and wash the inside of the bulbs. This wash water is controlled by means of a valve 43 (Fig. 10) operated by a cam 44 through a roller 45. The pipes 39 receive their supply of water from an outside source through a pipe 46 which communicates with a passage 47 formed in the base 10 (Fig. 12). A pipe 48 (Fig. 10) connects the passage 47 to a chamber controlled by the valve which at certain intervals is opened, thus allowing the water to flow through the pipe 49 into a passage 50 which connects with a passage 51, both passages being formed in the base 10. The passage 51 may be tapped at various places so as to allow the water to reach the manifold 52 through a regulating valve 53 (Fig. 4) and hollow standard 41. The overflow falls into the housing 40 and out into a drain pipe 54 through the pipe 55. During the washing process, the carrier is raised and lowered several times in quick succession, thereby moving the bulbs vertically up and down over the nozzles 42 so that the greatest force of the water issuing therefrom will strike at different points on the bulbs, to thoroughly wash them, and at the same time eliminate any streaks which might occur should the bulbs remain stationary during the washing process. This quick raising and lowering of the carrier is caused by the roller 32 riding over the hills 56 and into the valleys 57 formed on the cam 30. After the washing process has been completed, the carrier is raised so as to lift the bulbs over the pipes 39 and nozzles 42 and carry them upward a safe distance in order to clear them when the carrier is rotated to the next position.

As the bulbs arrive at the next station, indicated as B on Figs. 1, 3 and 14, the carrier is lowered so as to bring the lower ends of the bulbs in contact with means for removing the superfluous water which has accumulated on the rim of the bulb necks at the washing station. These means comprise a series of drip pads 58 which may be composed of any good absorbing material such as felt, etc. The pads, as shown, are disc shaped so as to rest in the cups 59 carried by the standards 60 (Fig. 14) extending from the housing 40. The carrier is raised and lowered several times in quick succession in order that the rims of the bulb necks will contact with the pads at intervals so as to allow the said pads to absorb the beads of water as they appear on the lower rims of the bulb necks. The carrier is next raised to its rotating level, where it is again rotated so as to bring the bulbs to the first position of the next station indicated as C on Figs. 1 and 3.

At station C is located a means for applying the frosting mixture to the inside of the bulbs, and, as shown in Figs. 3, 5, 6 and 7, comprises a pot 62 supported by legs 63 which rest on the base 10 of the machine. After the carrier stops, it is lowered so as to place the bulbs over a series of pipes 64 which extend from the pot 62. At the proper time, air pressure is applied through a pipe 65 so as to force the frosting mixture contained in the manifold 66 up through the pipes 64 to the inside of the bulbs. The air pressure is controlled by means of a valve 67 (Fig. 10) which is automatically operated by a cam 68 through a roller 69. Air pressure from an outside source (not shown) is delivered to the valve 67 by a pipe 70 which communicates with a passage 71 formed in the base 10. The passage 71 is connected to the valve (Fig. 10) by a pipe 72. At certain intervals the said valve is opened so as to allow the air to pass through the valve into a passage 73 which communicates with a passage 74, both passages being formed in the base 10, as shown in Fig. 12. The pipe 65 (Fig. 13) connects the passage 74 to the manifold 66 through a passage 75 formed in the chamber 76. The surplus frosting mixture falls on an inclined partition 77, where it flows into the chamber 76. During the frosting operation, the carrier is raised and lowered several times in quick succession, so as to move the bulbs up and down over the pipes 64, in order to secure an even spread of the frosting mixture and to avoid streaks. When a sufficient amount of frosting mixture has been applied to the bulbs, the air pressure is shut off by the closing of the valve 67, after which the pressure is released from the inside of the manifold by the opening of a valve 78, which allows the air to escape through a port 79 formed in the chamber 76. The opening and closing of the valve 78 is accomplished by means of a cam 80 (Figs. 3, 10 and 11) operating a master rod 81 through a roller 82 carried by a lever 83. The rod 81 operates a lever 84 through the connecting rods 85, 86 and 87. The rod 87 is connected to the rod 81 through a lever 88. The lever 84 is pivotally mounted on a standard 89 extending from the top of the chamber 76. The opening of the valve 78 occurs on the downward movement of the rod 85, which raises the opposite end of the lever 84, thereby rotating a crank 90 through the connecting link 91. The crank is pivotally mounted at 92, and carries at its opposite end the valve 78. The closing of the valve 78 is accomplished by means of a spring 93, which is fastened to one arm of the crank and to the top of the chamber 76. Simultaneously with the opening of the valve 78, a valve 94 is opened, so as to allow the frosting mixture to return to the manifold 66 through the opening 95. This valve is carried by a valve stem 96, which is pivotally connected to the lever 84 through the links 97. The closing of the valve 94 is accomplished by a spring 98 connected to the lever 84 at one end and at its opposite end to the top of the chamber 76. The frosting mixture is kept at the desired temperature by means of hot water contained in the compartment 99 of the pot 62. The water may be heated in various ways, but for illustrative purposes we show an electric heater 100, which may be inserted through the opening formed in the pot 62. The heater is supplied with current from a source (not shown) through the conductor 101. The compartment 99 communicates with the atmosphere through a vent 102 located therein, so as to take care of any rise in pressure during the heating of the water. After the bulbs have been frosted, the carrier is raised to its rotating level and rotated, stopping for a short time at each of the next two positions where the frosting mixture is again applied to the inside of the bulb, as previously described, through the pipes 64 located at these positions.

As the bulbs arrive at the next station, indicated as D on Figs. 1, 3 and 14, the carrier is lowered so as to place the bulbs over a series of pipes 103 which extend from the pot 62. At this station the bulbs receive a strengthening treatment by being subjected to a frosting mixture of lower degree than that used at the previous station. It has been found that the frosting mixture becomes weaker with use, and, therefore, good results have been secured by using for the strengthening treatment the original frosting mixture after it has become weak with use. The treating solution or weakened frosting mixture is contained in a main manifold 104 and is supplied to an auxiliary manifold 105 through the feed pipe 106. As shown in Fig. 6, the auxiliary manifold 105 is formed in the bottom of the pot 62 and is similar to the manifold 66, it being separated therefrom by means of a partition 107. The treating solution contained in the auxiliary manifold is applied to the bulbs through the pipes 103 by means of air pressure supplied through the pipe 65 to the main manifold, from which the solution is forced to the auxiliary manifold through the feed pipe 106. The air pressure is controlled by means of the valve 67 previously described in connection with the first frosting apparatus. Ordinarily the treating solution becomes weaker with use, but by applying the treating solution to the bulbs immediately after they have been frosted, a certain amount of the frosting mixture is washed from the bulbs and allowed to mix with the surplus treating solution, thereby regenerating it somewhat. The surplus solution falls down the inclined partition 108, where it is returned to the main manifold through the return pipe 109.

The carrier is next rotated from station D to station E, where the bulbs are again washed with water which is forced through the pipes 110 extending from the housing 111. After being washed, the lower ends of the bulbs are allowed to contact with the drip pads 112, located at station F. Both the washing and drip absorbing means contained in the housing 111 are duplicates of the washing and absorbing means previously described, which are located at stations A and B, respectively.

At stations G and H the bulbs are again frosted and treated by the frosting and treating means located at these stations, and, as shown, are similar to the frosting and treating means previously described at stations C and D. The bulbs are next carried to station I and placed over the pipes 113, where they are again washed, after which they are transferred to station J and placed over the pipes 114 for receiving their final strengthening treatment. The pot 115 located at this station contains the main manifold 104 for supplying the treating solution to the auxiliary manifold 105, located at stations D and H, and is identical with the frosting pots 62, with the exception of the auxiliary manifold such as contained in the pots 62.

After the bulbs have been properly treated at station J, they are lowered over the pipes 116, located at station K. At this station, the bulbs are thoroughly washed with water supplied to the pipes 116 from a manifold located in the housing 117. This wash water is controlled by means of the valve 43 previously described. The bulbs after being washed are carried to station L, where is located the preliminary drying means comprising a series of stationary pipes 118 extending from a housing 119. As the bulbs are lowered over the pipes 118, they are subjected to a stream of warm air which, at the proper time, is blown through the said pipes from a manifold located in the housing and connected to an air box through a pipe 120. At station L the greater portion of the inside of the bulbs is dried, but in order to dry their neck portions, where a considerable amount of water or moisture has collected, we provide a series of rotating driers which are located at station M. As the bulbs arrive at this station, the carrier is lowered at the appropriate time, so as to place the bulbs over the driers 121 shown more particularly in Figs. 2, 8 and 9. Each of these driers, as shown, comprises a pair of nozzles 122 and 123, carried by hollow castings 124, each of which is mounted on a hollow shaft 125. These shafts are rotatably supported in bearings 126 formed in the housing 127 supported by a standard 128 carried by the air box 129. The nozzles are continuously rotated by means of the pulleys 130 mounted on the shafts 125. Rotary motion is communicated to the pulleys from the main drive shaft 23 which operates a counter shaft 131 (Fig. 10) through a chain and sprocket connection 132. A belt 133 (Fig. 2) driven by pulley 134 mounted on the counter shaft 131 encircles the pulleys 130. The belt is held comparatively taut by the idlers 135 mounted on the housing 127. The air used at the drying stations L and M is supplied to the air box 129 from an outside source through a pipe 136 (Figs. 2 and 13). In order to warm the air, we insert in the box 129 an electric heating element attached to a plate 137 and connected to a source of current through the terminals 138 and 139. After the carrier has been lowered so as to place the bulbs over the driers, as shown in Fig. 2, a valve 140 is opened so as to allow the warm air to pass from the air box 129 up through the hollow standard 128 into a manifold 141. The air then passes from the manifold up through the hollow shafts 125 to the inside and outside walls of the bulbs through the slots 142 and 143 (Fig. 9) located in each of the nozzles 122 and 123, respectively. The air valve is opened and closed at the proper time by means of a cam 144 (Figs. 3 and 10) which operates a lever 145 through a roller 146. The lever 145 is rotatably mounted on a shaft carried by a bracket 147, and has attached to its opposite end a horizontal rod 148. The opposite end of the rod is fastened to a short lever 149 pivotally mounted at 150. The rotation of the lever 149 causes the opening or closing of the valve 140 through the attached rod 151. The bulbs being comparatively dry, the carrier is raised and rotated toward another operator who is stationed at X' and who removes the completed frosted bulbs from the carrier and replaces them with new unfrosted bulbs, whereupon the carrier continues to rotate intermittently, carrying the bulbs over a duplicate series of means indicated as A' to M' (Fig. 1), in order that they may be frosted and completed by the time they reach the first-mentioned operator, who, as hereinbefore stated, is located at X.

What we claim as new, and desire to secure by Letters Patent of the United States, is:

1. In a machine for treating the inside surfaces of hollow glass articles, the combination of a movable carrier provided with means for receiving an article, a plurality of fluid discharging means disposed in the path of said carrier and each comprising a nozzle disposed in the path of said carrier and adapted to project into said article and means for moving said carrier to cause said article to register successively with said fluid discharging means, and means for moving said carrier to cause said article to be moved longitudinally relative to said nozzle.

2. In a machine for treating the inside surfaces of hollow glass articles, the combination of a movable carrier provided with means for receiving a plurality of articles, a plurality of fluid discharging means disposed in the path of said carrier and each comprising a nozzle disposed in the path of said carrier and adapted to project into said article and means for moving said carrier to cause said article to register successively with said fluid discharging means, and means for moving said carrier to cause said article to be moved longitudinally relative to said nozzle.

3. In a machine for treating the inside surfaces of hollow glass articles, the combination of a movable carrier provided with means for receiving an article, a plurality of fluid discharging means disposed in the path of said carrier and each comprising a nozzle disposed in the path of said carrier and adapted to project into said article and automatic means for moving said carrier to cause said article to register successively with said fluid discharging means, and automatic means for moving said carrier to cause said article to be moved longitudinally relative to said nozzle.

4. In a machine for treating the inside surfaces of hollow glass articles, the combination of a movable carrier provided with means for receiving an article, a plurality of fluid discharging means disposed in the path of said carrier and each comprising a nozzle disposed in the path of said carrier and adapted to project into said article and automatic means for moving said carrier to cause said article to register successively with said fluid discharging means, and automatic means for moving said carrier to cause said article to be moved longitudinally relative to said nozzle while said fluid discharging means are in operation.

5. In a machine for treating the inside surfaces of open-ended hollow glass articles, the combination of a substantially horizontally disposed movable carrier provided with means for supporting an article with its open end downward, a plurality of fluid discharging means disposed in the path of said carrier and each comprising a nozzle disposed in the path of said carrier and adapted to project into said article, means for moving said carrier, to cause said article to register successively with said fluid discharging means, means for moving said carrier to cause said article to be moved longitudinally relative to said nozzle and means for then causing a discharge through said nozzle at predetermined intervals.

6. In a machine for treating the inside surfaces of open-ended hollow glass articles, the combination of a substantially horizontally disposed movable carrier provided with means for supporting an article with its open end downward, a plurality of fluid discharging means disposed in the path of said carrier and each comprising a nozzle disposed in the path of said carrier and adapted to project into said article, means for moving said carrier, to cause said article to register successively with said fluid discharging means, automatic means for moving said carrier to cause said article to be moved longitudinally relative to said nozzle, and means for then causing a discharge through said nozzle at predetermined intervals.

7. In a machine for treating the inside surfaces of open-ended hollow glass articles, the combination of a substantially horizontally disposed movable carrier provided with means for supporting an article with its open end downward, a plurality of fluid discharging means disposed in the path of said carrier and each comprising a nozzle disposed in the path of said carrier and adapted to project into said article, means for moving said carrier, to cause said article to register successively with said fluid discharging means, automatic means for moving said carrier to cause said article to be moved longitudinally relative to said nozzle, and automatic means for then causing a discharge through said nozzle at predetermined intervals.

8. In a machine for treating the inside surfaces of open-ended hollow glass articles, the combination of a substantially horizontally disposed movable carrier provided with means for supporting an article with its open end downward, a plurality of fluid discharging means disposed in the path of said carrier and each comprising a nozzle disposed in the path of said carrier and adapted to project into said article, automatic means for moving said carrier to cause said article to register successively with said fluid discharging means, automatic means for moving said carrier to cause said article to be moved longitudinally relative to said nozzle, and automatic means for then causing a discharge through said nozzle at predetermined intervals.

9. In a machine for treating the inside surfaces of open-ended hollow glass articles, the combination of a substantially horizontally disposed movable carrier provided with means for supporting an article with its open end downward, a plurality of fluid discharging means disposed in the path of said carrier and each comprising an upwardly directed nozzle, means for moving said carrier, means for causing said article to register successively with a nozzle of each of said fluid discharging means and for then causing a substantially longitudinal movement of said carrier relatively to said nozzle, and means for causing a discharge through said nozzle at predetermined intervals.

10. In a machine for treating the inside surfaces of open-ended hollow glass articles, the combination of a substantially horizontally disposed movable carrier provided with means for supporting an article with its open end downward, a plurality of fluid discharging means disposed in the path of said carrier and each comprising an upwardly directed nozzle, means for moving said carrier, means for causing said article to register successively with a nozzle of each of said fluid discharging means and for then causing a lowering of said carrier to pass the end of said article over said nozzle, and means for causing a discharge through said nozzle at predetermined intervals.

11. In a machine for treating the inside surfaces of open-ended hollow glass articles, the combination of a substantially horizontally disposed movable carrier provided with means for supporting an article with its open end downward, a plurality of fluid discharging means disposed in the path of said carrier and each comprising an upwardly directed nozzle, means for moving said carrier, means for causing said article to register successively with a nozzle of each of said fluid discharging means and for then automatically causing a substantially vertical movement of said carrier relatively to said nozzle, and means for causing a discharge through said nozzle at predetermined intervals.

12. In a machine for treating the inside surfaces of open-ended hollow glass articles, the combination of a substantially horizontally disposed movable carrier provided with means for supporting an article with its open end downward, a plurality of fluid discharging means disposed in the path of said carrier and each comprising an upwardly directed nozzle, means for moving said carrier, means for causing said article to register successively with a nozzle of each of said fluid discharging means and for then automatically causing a substantially vertical movement of said carrier relatively to said nozzle, and means for automatically causing a discharge through each nozzle at predetermined intervals.

13. In a machine for treating the inside surfaces of open-ended hollow glass articles, the combination of a substantially horizontally disposed movable carrier provided with means for supporting an article with its open end downward, a plurality of fluid discharging means disposed in the path of said carrier and each comprising an upwardly directed nozzle, means for moving said carrier, means for automatically causing said article to register successively with a nozzle of each of said fluid discharging means and for then automatically causing a substantially vertical movement of said carrier relatively to said nozzle, and means for automatically causing a discharge through said nozzle at predetermined intervals.

14. In a machine for treating the inside surfaces of open-ended hollow glass articles, the combination of a substantially horizontally disposed movable carrier provided with a series of means for supporting articles with their open ends downward, a plurality of fluid discharging means disposed in the path of said carrier and each comprising an upwardly directed nozzle, means for moving said carrier, means for causing said article to register successively with a nozzle of each of said fluid discharging means and for then causing a lowering of said carrier to pass the end of said article over said nozzle, and means for causing a discharge through said nozzle at predetermined intervals.

15. In a machine for treating the inside surfaces of hollow glass articles, the combination of a carrier provided with means for receiving an article, a fluid container having a nozzle adapted to discharge into said article when in registry therewith, and mechanism for moving the carrier to cause a substantially longitudinal reciprocation of said article relatively to said nozzle during the fluid discharging period.

16. In a machine for treating the inside surfaces of hollow glass articles, the combination of a carrier provided with means for receiving a glass article, a plurality of fluid containers each having a stationary nozzle disposed in the path of said carrier, automatic mechanism for moving said carrier so as to cause said article to register successively with each of said nozzles, means for discharging fluid into said article during registry and mechanism for moving the article longitudinally of the nozzle during the fluid discharging period.

In witness whereof, we have hereunto set our hands this 8th day of April, 1926.

ROSCOE G. PHELPS.
LUDWIG STAUDENMEIR.